United States Patent
Bourova et al.

(10) Patent No.: US 7,355,788 B2
(45) Date of Patent: Apr. 8, 2008

(54) ACTIVE OPTICAL FIBER FOR RAMAN AMPLIFICATION

(75) Inventors: Ekaterina Bourova, Boulogne-Billancourt (FR); Stephanie Blanchandin, Paris (FR); Florence Leplingard, Jouy-en-Josas (FR)

(73) Assignee: Alcatel, Paris (FR)

( * ) Notice: Subject to any disclaimer, the term of this patent is extended or adjusted under 35 U.S.C. 154(b) by 45 days.

(21) Appl. No.: 10/899,069

(22) Filed: Jul. 27, 2004

(65) Prior Publication Data
US 2005/0024713 A1    Feb. 3, 2005

(30) Foreign Application Priority Data
Jul. 29, 2003  (FR) ................... 03 09287

(51) Int. Cl.
*H01S 3/00*    (2006.01)
*C03B 37/075*  (2006.01)

(52) U.S. Cl. ................... 359/341.5; 65/390
(58) Field of Classification Search ........... 359/341.5, 359/334; 65/390
See application file for complete search history.

(56) References Cited

U.S. PATENT DOCUMENTS

| | | | |
|---|---|---|---|
| 4,820,018 A * | 4/1989 | Melman et al. ........... 385/127 |
| 6,410,467 B1 | 6/2002 | Dickinson et al. |
| 7,008,892 B2 * | 3/2006 | Bourova et al. ........... 501/37 |
| 2004/0091000 A1 * | 5/2004 | Kuksenkov ................ 372/3 |
| 2005/0037913 A1 * | 2/2005 | Peuchert et al. ........... 501/78 |

FOREIGN PATENT DOCUMENTS

| | | | |
|---|---|---|---|
| EP | 0 139 081 A2 | | 5/1985 |
| EP | 0 146 262 A2 | | 6/1985 |
| EP | 0 248 517 A2 | | 12/1987 |
| EP | 248517 B1 * | | 11/1994 |
| JP | 62128946 A * | | 6/1987 |
| WO | WO 3022755 A2 * | | 3/2003 |

OTHER PUBLICATIONS

Nakashima T et al: "Dependence of raman gain on relative index differences for G302-doped single-mode fibers" Optics Letters, vol. 10, No. 8, Aug. 1985, pp. 420-422, XP002260242.

* cited by examiner

*Primary Examiner*—Deandra M Hughes
(74) *Attorney, Agent, or Firm*—Sughrue Mion, PLLC

(57) ABSTRACT

A Raman amplification active optical fiber comprises a core containing silica oxide ($SiO_2$), lithium oxide ($Li_2O$), germanium oxide ($GeO_2$), and barium oxide (BaO). The core contains 30 to 90 molar percent of $SiO_2$ and less than 50 molar percent of the combination of $LiO_2$, $GeO_2$, and BaO. Application of the fiber to a multiwavelength Raman fiber laser.

11 Claims, 1 Drawing Sheet

FIG_1
Raman amplification wavelength with a 1117.2 nm pump
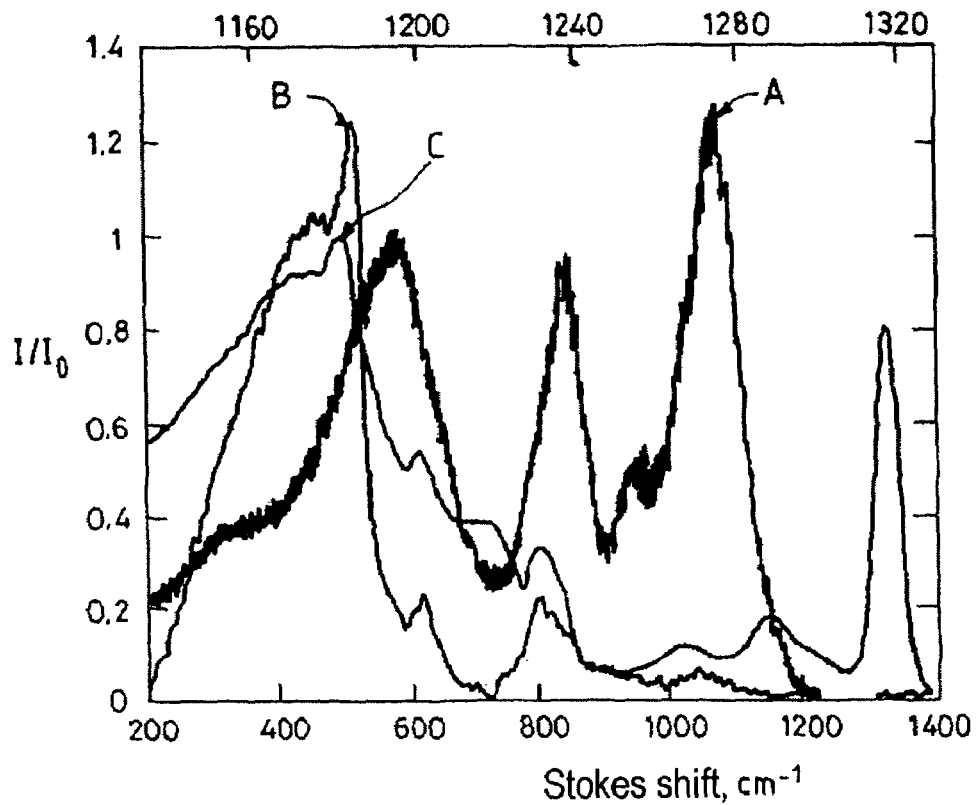
FIG_2
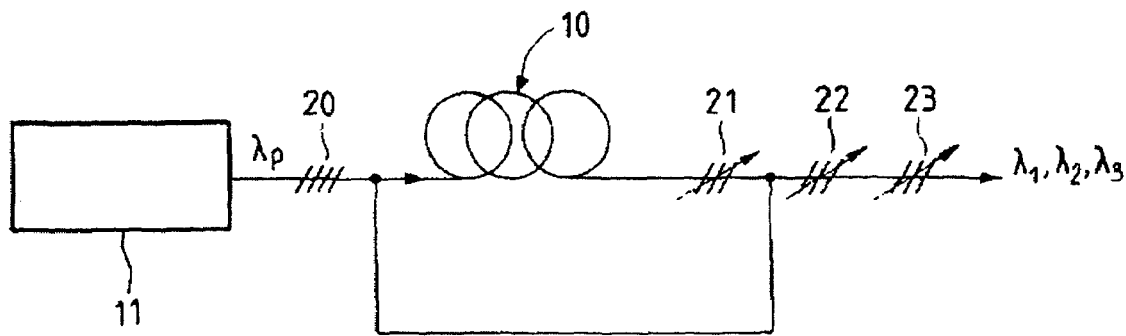

ACTIVE OPTICAL FIBER FOR RAMAN AMPLIFICATION

CROSS-REFERENCE TO RELATED APPLICATIONS

This application claims priority from French Patent Application 0309287 filed Jul. 29, 2003.

BACKGROUND OF THE INVENTION

1. Field of the Invention

The present invention relates to the field of optical fibers, more particularly active optical fibers for Raman amplification. An optimized fiber of this kind may be used to produce a tunable multiwavelength laser source operating by virtue of stimulated Raman emission in the fiber.

2. Description of the Related Art

"Les télécommunications par fibers optiques" ["Optical fiber telecommunications"] by I. and M. Joindot, Dunod, 1996, defines the Raman effect as photon-phonon coupling between an electromagnetic field and mechanical vibration of a medium. The Raman effect corresponds to coupling with optical phonons. Optical phonons correspond to vibrations internal to the molecular structures of the material. It is a nonlinear effect in which a pump photon is absorbed and a signal photon of lower energy is emitted from the material at the same time as a phonon.

Each material has a spontaneous Raman emission spectrum at given wavelengths, i.e. behaves like a set of oscillators each at a given vibration frequency. An emission spectrum characteristic of the material may therefore be established, with intensity spikes at given wavelengths known as Stokes lines. Glass being a disorderly amorphous material, its Raman spectrum is characterized by a large number of wavelengths forming a continuous spectrum over a wide band of frequencies.

The intensity of Raman emission increases with the input power applied to the material and becomes significant at a given power called the threshold. Thus by stimulating the material at a high optical power, for example using a pump laser, the intensity peak corresponding to spontaneous Raman emission can reach 100% of the intensity of the pump signal at a given wavelength. By exploiting the Raman emission of a material, it is therefore possible to amplify an optical signal strongly by passing it through said material when stimulated by an optical pump signal. An optical signal is also amplified if it has an optical wavelength at a given offset relative to the pump wavelength; in other words the wavelength of the Raman emission peak depends on the wavelength of the pump signal. Thus a Stokes shift is defined representative of the difference between the optical frequency in question and the pump optical frequency.

By feeding an amplified optical signal into the Raman amplification medium several times, it is possible to amplify and shift the optical signal progressively to obtain required optical power and wavelength characteristics.

Furthermore, a laser may be produced by associating the Raman amplification medium with appropriate Fabry-Perot cavities.

Raman amplifiers and Raman fiber lasers are therefore of great benefit in optical transmission system applications.

Modules are generally used that combine a plurality of pumps consisting of semiconductor diodes to pump Raman amplifiers. Multipump modules are costly, however, and consume a great deal of energy. Also, multipump modules employ a plurality of polarization-multiplexed diodes. Thus failure of one diode depolarizes the source. It is therefore beneficial to replace multipump modules with a Raman fiber laser that may be tuned to multiple wavelengths.

Most Raman amplifiers or Raman fiber lasers use fibers based on silica, germanosilicate or phosphosilicate. The Raman spectra of silica and germanosilicate comprise a single Raman emission band whose width yields shifts that do not exceed 100 nanometers (nm) when the material is subjected to a pump signal at 1.5 micrometers (μm). Fibers based on phosphosilicate have a Raman emission spectrum with two peaks yielding, when the material is subjected to a pump signal at 1.4 μm, a first shift that does not exceed 100 nm and corresponds to the shift produced by the silica and an additional shift of 300 nm.

Furthermore, a tunable Raman fiber laser is obtained by providing selection means at the output of the above kind of Raman fiber, for example by means of Bragg gratings. One such application is described in particular in "Six output wavelength Raman fiber laser for Raman amplification" by F. Leplingard et al., Electronics Letters, Aug. 1, 2002, Vol. 38, No. 16, pp. 886-887.

However, Raman amplifying fibers based on silica or germanosilicate have the drawbacks of a narrow amplification peak and the necessity to provide a large number of Bragg gratings to obtain a tunable wavelength laser. Raman amplification fibers based on phosphosilicate have the advantage of two widely spaced amplification peaks, which reduces the number of Bragg gratings, but their amplification gain is lower than that of Raman fibers based on silica or germanosilicate and the second amplification peak is very narrow.

If a multiwavelength laser is modeled on the basis of a Raman amplification fiber, the interactions between the peaks are significant and lead to gain differences that make the wavelengths emitted by the Raman fiber laser interdependent, which complicates the design of the laser.

SUMMARY OF THE INVENTION

One object of the present invention is to propose a new composition yielding an active optical fiber for improved Raman amplification having a plurality of independent amplification peaks, each peak having a high amplification gain and a large midheight width.

To this end, the invention proposes a Raman amplification active optical fiber comprising a core containing:

silica oxide ($SiO_2$), and germanium oxide ($GeO_2$), characterized in that the core of said fiber further contains:

lithium oxide ($Li_2O$), and barium oxide ($BaO$), said fiber containing an amplifying medium comprising 30 to 90 molar percent of $SiO_2$ and less than 50 molar percent of the combination of $LiO_2$, $GeO_2$, and $BaO$.

According to a feature of the invention, the core further comprises less than 40 molar percent of a dopant.

Depending on the embodiment, the dopant is an alkali earth compound or an alkali metal compound.

According to a feature of the invention, the core further comprises a sulfur compound.

According to a feature of the invention, the core further comprises one or more oxides selected from the group comprising $P_2O_5$, $B_2O_3$, $Al_2O_3$, $Ta_2O_5$, $V_2O_5$, $As_2O_3$, $TiO_2$, $ZrO_2$, $PbO$, $Bi_2O_3$, $Mo_2O_3$, $WO_3$, $SnO_2$, $Sb_2O_3$, $Ga_2O_3$, $In_2O_3$, $TeP_2$.

The invention also consists in a multiple wavelength Raman fiber laser comprising an optical fiber according to the invention.

According to a feature of the invention, the laser comprises one or more Bragg gratings.

According to a feature of the invention, the Bragg grating is tunable.

BRIEF DESCRIPTION OF THE DRAWINGS

The features and advantages of the invention will become more clearly apparent on reading the following description, which is given by way of illustrative and non-limiting example and with reference to the appended drawings, in which:

FIG. 1 is a graph showing the spontaneous Raman emission spectra of an amplifying fiber according to the invention (curve A), a standard silica fiber (curve B) and a phosphosilicate fiber (curve C), and FIG. 2 shows a Raman fiber laser including an amplifying fiber of the invention.

DETAILED DESCRIPTION

The invention relates to an optical fiber composition showing heightened Raman activity. The amplification medium of this fiber, contained in the core of the fiber, comprises from 30 to 90 molar percent of silica oxide ($SiO_2$) and less than 50 molar percent of a mixture of lithium oxide ($Li_2O$), germanium oxide ($GeO_2$), and barium oxide (BaO).

Doping the silica with lithium, germanium, and barium creates three amplification peaks by Raman emission from the material which are independent and of equivalent optical gain.

FIG. 1 depicts the Raman emission spectrum of a fiber having the composition of the invention (curve A) compared to the Raman emission spectra of a standard silica fiber (curve B) and a phosphosilicate fiber (curve C).

Each curve plots the normalized emission intensity $I/I_0$ in relation to its first amplification peak 10 on the ordinate axis as a function of the Raman amplification wavelength expressed in nanometers obtained with a 1117.2 nm pump on the top abscissa axis and as a function of the Stokes shift expressed per centimeter ($cm^{-1}$) on the bottom abscissa axis. Here the Stokes shift is defined as the absolute value of the difference of the reciprocals of the wavelengths of the pump and of the signal concerned, that is to say $|1/\lambda p - 1/\lambda s|$, where $\lambda p$ and $\lambda s$ are expressed in cm.

The three Raman emission peaks of the amplifying fiber of the invention at 557 $cm^{-1}$, 835 $cm^{-1}$ and 1063 $cm^{-1}$ are independent of each other and correspond to wavelength shifts in the amplified signal of 78 nm, 121 nm and 158 nm, respectively, when the material is subjected to a pump signal at 1.117 μm.

The midheight widths of the Raman amplification emission peaks of the fiber of the invention, which are respectively 217 $cm^{-1}$, 98 $cm^{-1}$ and 103 $cm^{-1}$, are of the same order of magnitude as that of the amplification peak of a silica fiber (203 $cm^{-1}$) and three times that of the second peak of a phosphosilicate fiber (34 $cm^{-1}$). Also, the germanium in the composition guarantees an effective Raman gain higher than that of a phosphosilicate fiber.

The composition of the amplifying medium of the Raman fiber of the invention may further contain a dopant such as an alkali earth compound, for example MgO, CaO, or an alkali metal compound, for example $Na_2O$, $K_2O$, in a concentration of less than 40 molar percent. Adding this dopant into the concentration encourages the synthesis of the material in the vitreous state and/or modifies its optical characteristics.

The composition of the amplification medium of the Raman fiber of the invention may also be improved by adding a sulfur compound or one or more oxides from the group comprising $P_2O_5$, $B_2O_3$, $Al_2O_3$, $Ta_2O_5$, $V_2O_5$, $As_2O_3$, $TiO_2$, $ZrO_2$, PbO, $Bi_2O_3$, $Mo_2O_3$, $WO_3$, $SnO_2$, $Sb_2O_3$, $Ga_2O_3$, $In_2O_3$, $TeO_2$. This improves the stability of the composition and strengthens the Raman amplification properties mentioned above.

A fiber of the above kind may be fabricated by a standard modified chemical vapor phase deposition (MCVD) process or by drawing a preform using a double crucible.

The amplifying fiber of the invention finds an advantageous application in a multiwavelength laser. Raman fiber lasers find a particular application as pump sources in optical amplifiers because a Raman fiber laser is able to deliver high power over a wide band of wavelengths.

FIG. 2 shows diagrammatically a Raman fiber laser of the invention.

This kind of laser comprises a portion of Raman amplifying fiber 10 to which is coupled a pump source 11 for stimulating the Raman amplifying medium. The laser emits an optical signal at a given wavelength depending on the wavelength $\lambda p$ of the pump source and the composition of the material constituting the amplifying medium of the Raman fiber 10.

The fiber portion 10 is disposed between two mirror elements serving as facets of the laser cavity. A first mirror 20 that is highly reflective at the wavelength concerned, such as a straight Bragg grating, for example, is placed between the pump 11 and the amplifying fiber 10. This mirror 20 transmits the pump signal $\lambda p$ to the fiber 10 but reflects any light signals contrapropagating from the fiber 10 to the pump source 11. A second mirror 21 is disposed at the exit from the fiber 10. This mirror, such as a corner Bragg grating, for example, is weakly reflective and constitutes the exit facet of the laser of the invention.

According to the invention, the composition of the Raman amplifying fiber 10 leads to the emission of three signals at three different wavelengths $\lambda_1$, $\lambda_2$, $\lambda_3$.

A filter at the output of the fiber 10, such as a Bragg grating 21, for example, selects one of the wavelengths for reinjection into the amplifying fiber to produce a reamplified and reshifted signal. The Bragg grating 21 may be tunable, for example by applying a mechanical stress with a piezoelectric element or by applying a thermal stress to vary the selected wavelength.

The filter may be replaced by an optical multiplexer which distributes the optical signal(s) at one or more of the wavelengths $\lambda_1$, $\lambda_2$, $\lambda_3$ emitted by the fiber 10 between an exit of the laser and/or the point of reinjection into the amplifier medium of the fiber.

According to the invention, a multiwavelength laser may be produced with a limited number of Bragg gratings.

For example, it is required to emit three signals at three wavelengths in the S band using a pump source 11 for which $\lambda p = 1117.2$ nm. In the case of a standard germanosilicate composition, five successive shifts of 430 $cm^{-1}$ would be necessary before adjusting the three emission wavelengths to 1427 nm, 1455 nm and 1480 nm with three different Bragg gratings that form three external cavities of the laser.

In the case of the composition of the invention, the pump signal causes the emission of three shifted signals corresponding to the three Raman emission peaks of the composition. One of the signals is selected by a Bragg grating 21, for example the signal with the highest Stokes shift of 1063 cm$^{-1}$. The selected signal adjusted to 1267 nm is then reintroduced into the amplifying medium of the fiber 10 where it is again amplified and distributed over three emissions with respective Stokes shifts of 557 cm$^{-1}$, 835 cm$^{-1}$ and 1063 cm$^{-1}$. Three signals having respective wavelengths $\lambda_1=1364$ nm, $\lambda_2=1417$ nm and $\lambda_3=1465$ nm are then emitted by the Raman fiber laser of the invention. Where applicable, the Bragg gratings 21, 22, 23 may be placed at the exit of the laser of the invention to adjust the wavelengths emitted.

However, unlike the Raman fiber laser based on germanosilicate mentioned above, no additional Bragg grating is necessary for distributing a single output signal to provide three signals at different wavelengths.

Furthermore, when a single wavelength is reinjected into the amplifying medium, as described in the above numerical example, the optical gains at the wavelengths $\lambda_1$, $\lambda_2$, $\lambda_3$ finally emitted by the laser are substantially identical.

It is to be understood that many other possibilities of selecting one or the other of the emissions amplified by the Raman composition of the invention may be envisaged. In particular, within the limits of undesirable optical interactions, one or more of the wavelengths $\lambda_1$, $\lambda_2$, $\lambda_3$ emitted by the amplifying fiber 10 may be reintroduced into the amplifying medium, for example by means of a plurality of total reflection Bragg gratings for each of the respective wavelengths $\lambda_1$, $\lambda_2$, $\lambda_3$, to generate three optical signals with reshifted wavelengths.

According to the invention, by adding a limited number of Bragg gratings a multiwavelength laser may be produced offering great flexibility in the choice of the emission wavelength and good tunability.

What is claimed is:

1. A Raman amplification active optical fiber comprising an amplifier medium comprising 30 to 90 molar percent of silica oxide ($SiO_2$) and a mixture of germanium oxide ($GeO_2$), lithium oxide ($Li_2O$) and barium oxide (BaO), said mixture being in a proportion less than 50 molar percent; wherein the germanium oxide ($GeO_2$), lithium oxide ($Li_2O$) and barium oxide (BaO) are the active compounds which cause stimulated emission.

2. An optical fiber according to claim 1, wherein the amplifier medium further comprises less than 40 molar percent of a dopant.

3. An optical fiber according to claim 2, wherein the dopant comprises a compound selected from the group comprising an alkali earth compound and an alkali metal compound.

4. An optical fiber according to claim 1, wherein the amplifier medium further comprises a sulfur compound.

5. An optical fiber according to claim 1, wherein the amplifier medium further comprises one or more oxides selected from the group comprising $P_2O_5$, $B_2O_3$, $Al_2O_3$, $Ta_2O_5$, $V_2O_5$, $A_s2O_3$, $TiO_2$, $ZrO_2$, PbO, $Mo_2O_3$, $WO_3$, $SnO_2$, $Sb_2O_3$, $Ga_2O_3$, $In_2O_3$, $TeO_2$.

6. A multiple wavelength Raman fiber laser comprising an optical fiber comprising an amplifier medium comprising 30 to 90 molar percent of silica oxide ($SiO_2$) and a mixture of germanium oxide ($GeO_2$), lithium oxide ($Li_2O$) and barium oxide (BaO), said mixture being in a proportion less than 50 molar percent; wherein the germanium oxide ($GeO_2$), lithium oxide ($Li_2O$) and barium oxide (BaO) are the active compounds which cause stimulated emission.

7. A Raman fiber laser according to claim 6, comprising one or more Bragg gratings wherein the one or more Bragg gratings are tunable.

8. A Raman fiber laser according to claim 6, wherein the amplifier medium further comprises less than 40 molar percent of a dopant.

9. A Raman fiber laser according to claim 8, wherein the dopant comprises a compound selected from the group comprising an alkali earth compound and alkali metal compound.

10. A Raman fiber laser according to claim 6, wherein the amplifier medium further comprises a sulfur compound.

11. A Raman fiber laser according to claim 6, wherein the amplifier medium further comprises one or more oxides selected from the group comprising $Al_2O_3$, $Ta_2O_5$, $V_2O_5$, $A_s2O_3$, $TiO_2$, $ZrO_2$, PbO, $Mo_2O_3$, $WO_3$, $SnO_2$, $Sb_2O_3$, $Ga_2O_3$, $In_2O_3$, $TeO_2$.

* * * * *